(12) United States Patent
Lovlekar et al.

(10) Patent No.: US 11,812,333 B2
(45) Date of Patent: Nov. 7, 2023

(54) POWER EFFICIENT OPERATION AT SIGNIFICANT LOCATIONS

(71) Applicant: Apple Inc., Cupertino, CA (US)

(72) Inventors: Srirang A. Lovlekar, Fremont, CA (US); Murtaza A. Shikari, Mountain View, CA (US); Zheng Lu, Santa Clara, CA (US); Pankaj Subhash Vasandani, San Jose, CA (US); Srinivasan Nimmala, San Jose, CA (US); Sethuraman Gurumoorthy, San Ramon, CA (US); Viswanath Nagarajan, San Jose, CA (US); Lakshmi N. Kavuri, San Jose, CA (US); Sridhar Prakasam, Fremont, CA (US); Robert K. Kitchens, San Jose, CA (US); Vijay Venkataraman, San Jose, CA (US); Muthukumaran Dhanapal, San Diego, CA (US); Xiangpeng Jing, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/663,118

(22) Filed: May 12, 2022

(65) Prior Publication Data
US 2022/0337970 A1 Oct. 20, 2022

Related U.S. Application Data

(62) Division of application No. 16/380,102, filed on Apr. 10, 2019, now Pat. No. 11,343,640.

(51) Int. Cl.
*H04W 4/02* (2018.01)
*H04W 64/00* (2009.01)
*H04W 8/18* (2009.01)
*H04W 8/08* (2009.01)
*H04W 76/11* (2018.01)
*H04W 8/30* (2009.01)
*H04W 24/10* (2009.01)
*H04B 7/0456* (2017.01)
(Continued)

(52) U.S. Cl.
CPC .......... *H04W 4/023* (2013.01); *H04B 7/0456* (2013.01); *H04W 8/08* (2013.01);
(Continued)

(58) Field of Classification Search
None
See application file for complete search history.

(56) References Cited

U.S. PATENT DOCUMENTS 9,807,661 B1 10/2017 Manepalli et al.
10,373,494 B1 * 8/2019 Krysiuk ................ H04W 4/023
(Continued)

FOREIGN PATENT DOCUMENTS

CN 106717049 5/2017

*Primary Examiner* — Sai Aung
(74) *Attorney, Agent, or Firm* — Fay Kaplun & Marcin, LLP

(57) ABSTRACT

A device and method for a user equipment (UE) to implement power savings mechanisms when operating within a significant location. The UE identifies that the UE is at a significant location. The significant location is a location relative to a currently camped cell of a network. At a first time and at the significant location, the UE performs a type of operation related to the network connection. The UE stores information corresponding to the performance of the type of operation at the first time in a profile associated with the significant location. At a second time and at the significant location, the UE performs the type of operation related to the network connection. The performance of the type of operation at the second time is modified based on the information stored in the profile associated with the significant location.

20 Claims, 11 Drawing Sheets

(51) Int. Cl.
*H04W 74/08* (2009.01)
*H04W 80/02* (2009.01)
*H04W 36/08* (2009.01)
*H04W 84/12* (2009.01)

(52) U.S. Cl.
CPC ............ *H04W 8/30* (2013.01); *H04W 24/10* (2013.01); *H04W 36/08* (2013.01); *H04W 74/0833* (2013.01); *H04W 76/11* (2018.02); *H04W 80/02* (2013.01); *H04W 84/12* (2013.01)

(56) References Cited

U.S. PATENT DOCUMENTS

| | | | |
|---|---|---|---|
| 2007/0287476 A1* | 12/2007 | Jeong | H04W 76/10 455/456.6 |
| 2010/0291951 A1* | 11/2010 | Wahlander | H04W 52/282 455/456.6 |
| 2012/0120922 A1 | 5/2012 | Huang et al. | |
| 2014/0133465 A1* | 5/2014 | Johansson | H04W 76/18 370/332 |
| 2015/0351013 A1 | 12/2015 | Zhang et al. | |
| 2016/0087831 A1 | 3/2016 | Shah et al. | |
| 2016/0302106 A1* | 10/2016 | Lei | H04W 28/0226 |
| 2016/0316410 A1 | 10/2016 | Tan et al. | |
| 2017/0094574 A1 | 3/2017 | Singh et al. | |
| 2018/0249383 A1* | 8/2018 | Martin | H04W 36/0061 |
| 2020/0236573 A1* | 7/2020 | Zhang | H04W 76/27 |
| 2020/0329338 A1* | 10/2020 | Lovlekar | H04W 24/08 |
| 2021/0014664 A1* | 1/2021 | Wu | H04W 8/08 |
| 2021/0160749 A1* | 5/2021 | Lu | H04W 36/245 |
| 2022/0377635 A1* | 11/2022 | Hviid | H04W 36/06 |

* cited by examiner

POWER EFFICIENT OPERATION AT SIGNIFICANT LOCATIONS

BACKGROUND

A user equipment (UE) may be configured to establish a connection to at least one of a plurality of different networks or types of networks. To establish the connection and perform the full scope of functionalities normally available to the UE via the network connection, the UE may camp on a cell of a corresponding network.

The user and thus, the UE may spend a substantial amount of time at a particular location. For example, the UE may often be located at the user's home. Generally, when the UE is at the particular location, the UE may interact with the network via the same cells and encounter similar scenarios related to the network connection. Under conventional circumstances, the UE may not consider the results of previous interactions with the network that occurred while operating from the particular location. Thus, despite previous interactions with the network from the particular location having a certain result, the UE may repeat operations in the conventional manner each time the UE operates from the particular location. However, performing operations related to the network connection may cause the UE to experience a power drain. Accordingly, repeating operations under similar circumstances in the conventional manner may be an inefficient use of a limited power supply.

SUMMARY

According to an exemplary embodiment, a method may be performed by a user equipment (UE) configured to establish a connection with a network. The method includes identifying that the UE is at a significant location. The significant location is a location relative to a currently camped cell of the network. The method further includes, performing, at a first time and at the significant location, a type of operation related to the network connection. The method further includes, storing information corresponding to the performance of the type of operation at the first time. The information is stored in a profile associated with the significant location. The method further includes, performing, at a second time and at the significant location, the type of operation related to the network connection. The performance of the type of operation at the second time is modified based on the information stored in the profile associated with the significant location.

According to another exemplary embodiment, a method may be performed by a user equipment (UE) configured to establish a connection with a network. The method includes, identifying a first predetermined condition. The first predetermined condition indicates that the UE is located at a location relative to a camped cell of the network for a predetermined amount of time. The method further includes, generating a profile for the location based on identifying the first predetermined condition. The method further includes, collecting, when at the location, information corresponding to at least one of characteristics of the network or behavior of the UE. The information is stored in the profile for the location.

According to a further exemplary embodiment, a user equipment (UE) includes a transceiver configured to establish a connection with a cellular network and a processor configured to perform operations. The operations comprising identifying that the UE is at a significant location. The significant location is a location relative to a currently camped cell of the cellular network. The operations further comprising, performing, at a first time and at the significant location, a type of operation related to the cellular network connection. The operations further comprising, storing information corresponding to the performance of the type of operation at the first time. The information is stored in a profile associated with the significant location. The operations comprising, performing, at a second time and at the significant location, the type of operation related to the network connection. The performance of the type of operation at the second time is modified based on the information stored in the profile associated with the significant location.

DETAILED DESCRIPTION

Figure 1:
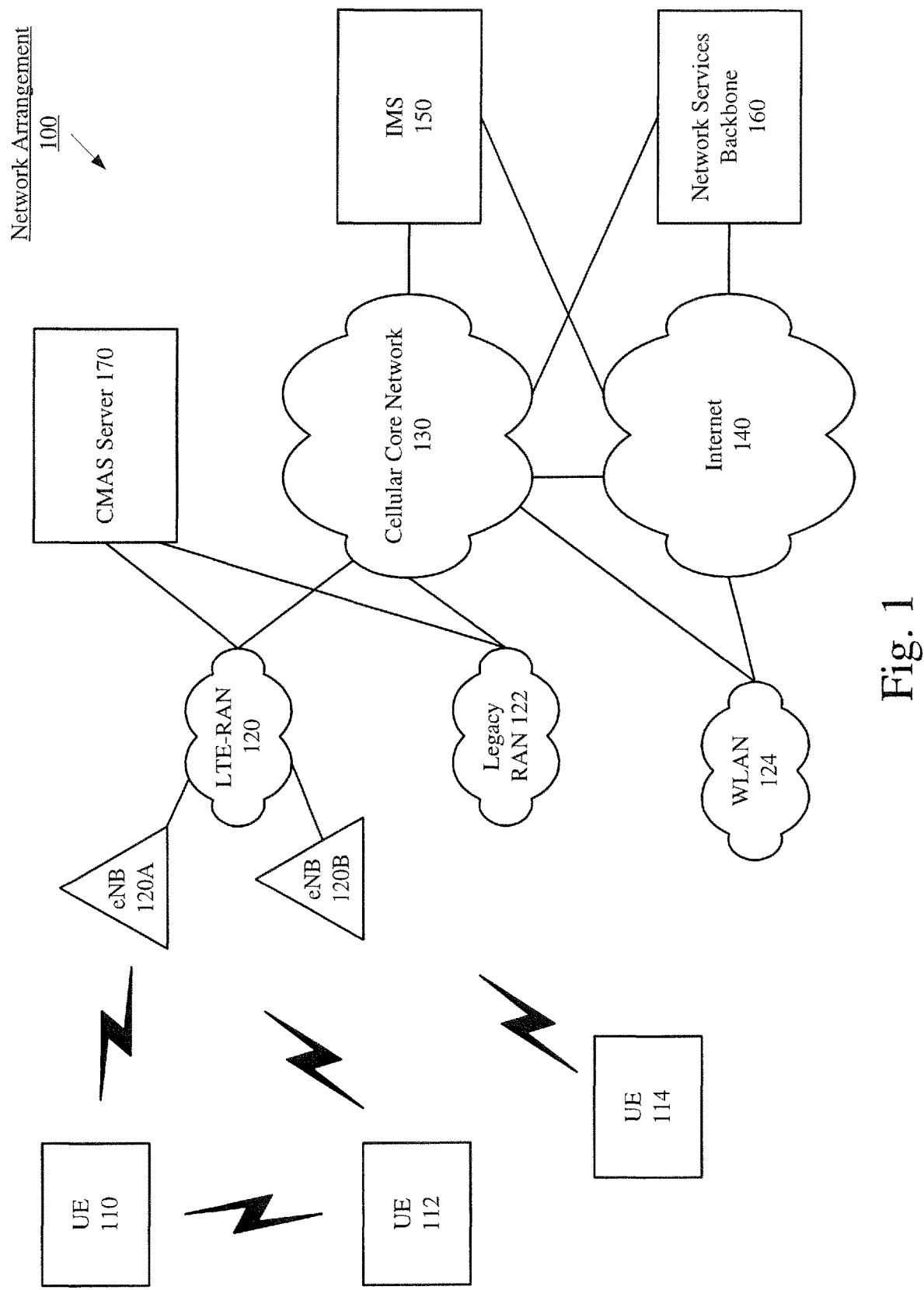
FIG. 1 shows an exemplary network arrangement according to various exemplary embodiments described herein.

The exemplary embodiments may be further understood with reference to the following description and the related appended drawings, wherein like elements are provided with the same reference numerals. The exemplary embodiments describe a device, system and method for a user equipment (UE) to implement various power saving mechanisms based on the UE's previous interactions with the network from a particular location.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The UE may establish a connection to at least one of a plurality of different networks or types of networks. The UE and the network may communicate via a cell of the corresponding network. The exemplary embodiments may be described with regard to a Long Term Evolution (LTE) network and an Evolved Node B (eNB). However, any reference to a particular network or a particular type of cell is merely provided for illustrative purposes. Those skilled in the art will understand that the network may be any type of network and the cell may be any type of cell within the corresponding network.

The exemplary embodiments are described with regard to a significant location. Throughout this description the term significant location may refer to a general area relative to at least one cell of the corresponding network in which the UE spends a predetermined amount of time. When the UE identifies a significant location, the UE may store information related to the UE's interactions with the network when located in the significant location. Subsequently, when operating at the significant location, the UE may implement various power saving mechanisms based on the stored information.

The UE may be configured to identify a plurality of significant locations. To manage the stored information for a plurality of significant locations, the UE may generate a protocol profile for a significant location and maintain a database of protocol profiles. Each protocol profile may generally include information regarding the characteristics of the network and/or the behavior of UE relative to the corresponding significant location. However, reference to a protocol profile or any specific type of stored information associated with a significant location is merely provided for illustrative purposes. The UE may store any type of information related to the UE's interactions with the network from the significant location in any appropriate manner.

To provide an example, the UE may identify a general area surrounding or within the user's home as a significant location. When operating at the user's home, the UE may interact with the network via a set of cells because these cells have corresponding coverage areas that include the user's home. Conventionally, the UE may not consider previous interactions with these cells from this location. As a result, each time the UE interacts with these cells from this location the UE may repeat operations related to the network connection in the same manner. The exemplary embodiments relate to the UE modifying conventional operations based on previous experiences at the significant location. Thus, instead of repeating operations related to the network connection in the same manner, the UE may perform the operations in a power efficient manner based on the stored information.

The UE may also be configured to establish a connection to a companion UE via a short-range communication protocol. The exemplary embodiments may relate to a UE that is equipped with this configuration but operating in standalone mode. Throughout this description, standalone mode may refer to a mode of operation where the UE directly connects to the cellular network. A UE that is configured to establish a connection via a companion UE may be, for example, a wearable device. For a variety of different reasons, conventional wearable devices may not be intended to primarily operate in standalone mode. The exemplary embodiments may enable the UE to primarily operate in standalone mode. Thus, compared to conventional wearable devices, the exemplary embodiments may enable a UE to operate in standalone mode for longer durations. However, any reference to a particular type of UE or a particular operating mode is merely provided for illustrative purposes. The exemplary embodiments may apply to any type of UE.

FIG. 1 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of three UEs 110-114 is only provided for illustrative purposes.

Each of the UEs 110-114 may be configured to communicate directly with one or more networks. In the example of the network configuration 100, the networks with which the UEs 110-114 may wirelessly communicate are a LTE radio access network (LTE-RAN) 120, a legacy radio access network (RAN) 122 and a wireless local access network (WLAN) 124. However, the UEs 110-114 may also communicate with other types of networks (e.g., 5G new radio (NR), etc.) and the UEs 110-114 may also communicate with networks over a wired connection. Therefore, the UEs 110-114 may include a LTE chipset to communicate with the LTE-RAN 120, a legacy chipset to communicate with the legacy RAN 122 and a WLAN chipset to communicate with the WLAN 124.

Each of the UEs 110-114 may also be configured to communicate with at least one of the other UEs 110-114 without using the networks 120-124. In the example of the network configuration 100, the UE 110 may communicate with the UE 112 using a short-range communication protocol such as BlueTooth. Thus, if the UE 110 and the UE 112 are within a proximity of one another (e.g., within a distance in which BlueTooth communications may be performed), the UE 110 and the UE 112 may exchange data. In one exemplary scenario, if the short-range communication protocol is being used, the UE 110 and the UE 112 may have a companion relationship where the UE 110 is an accessory device and the UE 112 is a source device. Thus, in certain operating modes, the UE 110 may be configured to access network services by utilizing only the short-range communication protocol without connecting to any of the networks 120-124. In this exemplary operating mode, the UE 112 may connect to one or more of the networks 120-124 and relay data exchanged with the one or more networks 120-124 to the UE 110 over the short-range communication pathway. However, in other operating modes, the UE 110 may connect to one or more of the networks 120-124 regardless of whether the companion relationship with a further UE has been established.

The LTE-RAN 120 and the legacy RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110-114 may connect to the LTE-RAN 120 via an evolved Node B (eNB) 120A, 120B. Those skilled in the art will understand that any association procedure may be performed for the UEs 110-114 to connect to the LTE-RAN 120. For example, as discussed above, the LTE-RAN 120 may be associated with a particular cellular provider where the UE 110 and/or the user thereof has a contract and credential information (e.g., stored on a SIM card). Upon detecting the presence of the LTE-RAN 120, the UEs 110-114 may transmit the corresponding credential information to associate with the LTE-RAN 120. More specifically, the UEs 110-114 may associate with a specific cell (e.g., the eNB 120A or the eNB 120B of the LTE-RAN 120). As mentioned above, the use of the LTE-RAN 120 is for illustrative purposes and any type of network may be used. For example, the UEs 110-114 may also connect to the Legacy RAN 122 or the 5G NR (not pictured).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks.

The network arrangement 100 may further include a CMAS server 170 that may generate emergency messages and/or emergency message indications (e.g., pings) to be broadcast over the cellular networks 120, 122 to the UEs 110-114. Since the CMAS messages are only broadcast over a cellular network, to comply with various regulations and/or standards the UEs 110-114 may remain connected, in some manner, to a cellular network, even when the UEs 110-114 have established a connection to a non-cellular network such as the WLAN 124. The network arrangement 100 shows the CMAS server 170 directly connected to each cellular network (e.g., LTE-RAN 120 and Legacy RAN 122). However, this is merely provided for illustrative purposes, CMAS server 170 may be connected to the cellular networks via the cellular core network 130.

Figure 2:
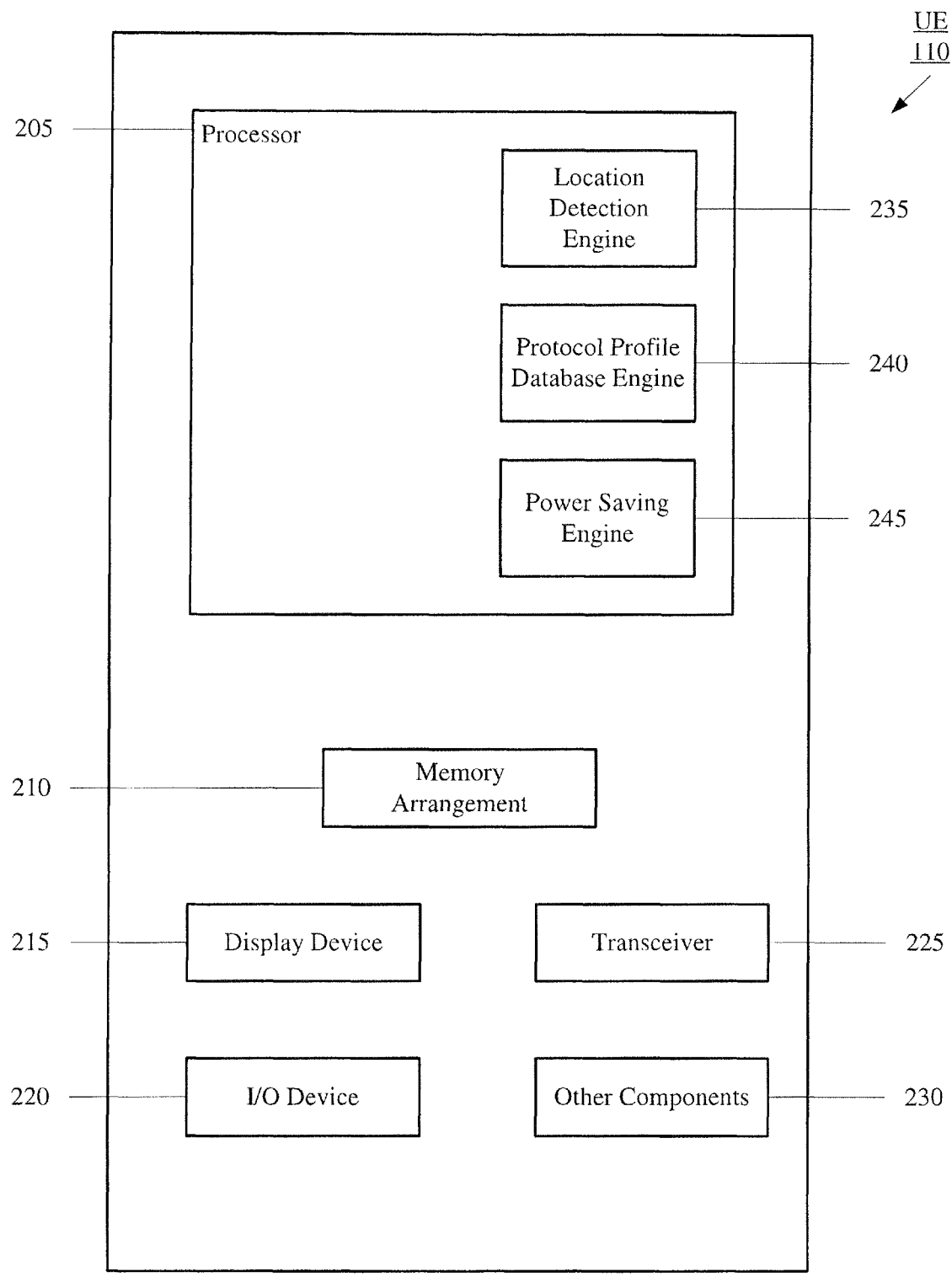
FIG. 2 shows an exemplary UE according to various exemplary embodiments described herein.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. A person of ordinary skill in the art would understand that the UE 110 may also represent the UEs 112, 114.

The processor 205 may be configured to execute a plurality of engines for the UE 110. For example, the engines may include a significant location detection engine 235, a protocol profile database engine 240 and a power saving engine 245. The significant location detection engine 235 may enable the UE 110 to identify that a particular location is a significant location. The protocol profile database engine 240 may enable the UE 110 to maintain a plurality of protocol profiles for a plurality of corresponding significant locations. The power saving engine 245 may enable the UE 110 to implement various power saving mechanisms when the UE 110 is operating from a significant location.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an application processor. The exemplary embodiments may be implemented in any of these or other configurations of a UE.

The memory 210 may be a hardware component configured to store data related to operations performed by the UE 110. As will be described in further detail below, the memory 210 may store data associated with the conditions of the UE 110 when a determination of the operating mode is performed. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the legacy RAN 122, the WLAN 124, etc. Accordingly, the transceiver 225 may operate on a variety of different frequencies or channels (e.g., set of consecutive frequencies).

Declaring a Significant Location

As mentioned above, a significant location may refer to a general area relative to at least one cell of the corresponding network in which the UE 110 spends a predetermined amount of time. The mechanism the UE 110 may implement to declare an area a significant location may include, in part, monitoring the amount of time the UE 110 is camped on a particular cell. If the UE 110 is camped on the cell for at least the predetermined amount of time, the UE 110 may declare the general area within the vicinity of its current location a significant location. The exemplary embodiments may apply to the predetermined amount of time being set to any appropriate value such as, but not limited to, 5 minutes, 10 minutes, 20 minutes, 30 minutes, 45 minutes, 1 hour, 1 hour 30 minutes, 2 hours, etc.

The mechanism used to declare an area a significant location and the process of maintaining the protocol profile is intended to enable the UE 110 to implement power saving mechanisms at locations which the UE 110 frequently visits and/or at which the UE 110 spends a considerable amount of time. For example, the UE 110 may be located at the user's office Monday-Friday for 6 to 8 hours a day, the UE may be located at the user's home nearly every night for 10 hours a day, etc. Thus, the exemplary embodiments are intended to generate and maintain protocol profiles that enable the UE 110 to conserve power when located at these types of locations. Since the locations at which the user may visit and/or spend a considerable amount of time may change, the exemplary embodiments enable the UE 110 to maintain a protocol profile database that adapts to the user's activities. Thus, if the user begins to attend a different work place and no longer returns to the user's previous work place, any significant locations corresponding to the user's previous work place will eventually be removed from the database to make room for new locations in which the user may spend a considerable amount of time. However, as mentioned above, the UE 110 declares a significant location based, in part, on being camped on a particular cell for a predetermined amount of time. In addition, the UE 110 may determine a significant location even if the UE 110 is out of cellular coverage by mapping the significant location to the cell in which the device was previously camped on before losing cellular coverage. Thus, any reference to a particular type of location being a significant location is merely provided for illustrative purposes. The exemplary embodiments may declare any type of location a significant location.

Each significant location may be a different size. Determining the size of a significant location may be based on any of a number of different factors. As will be described, in detail below with regard to FIG. 3, the UE 110 may determine the size of a significant location based on information from the application processor. This may enable the UE 110 to associate the significant location with a general geographic area (e.g., 100 square meters, 10,000 square meters, dimensions of the user's work place, dimensions of the user's home or property, etc.). However, the UE 110 may also determine a significant location based on information from the baseband processor. This may enable the UE 110 to associate the significant location with the cellular characteristics of a general area relative to at least one cell of the network (e.g., camped cell ID, neighbor cell ID, measurement data, etc.). Thus, in some exemplary embodiments, the significant location may not be defined by a geographical location but rather may be defined by a combination of the identity of network entities, further characteristics of the cellular environment and/or the behavior of the UE 110. Accordingly, the UE 110 may declare a significant location based on only information collected by the application processor (e.g., sensors such as, barometer, motion processor, lo-accuracy GPS, etc.), only information collected by the baseband processor, or a combination thereof.

After a significant location is declared, the UE 110 may continue to collect information corresponding to the significant location and update the corresponding protocol profile. Thus, the size and/or the characteristics indicative of a significant location may change over time as more information about the significant location is learned by the UE 110.

Figure 3:
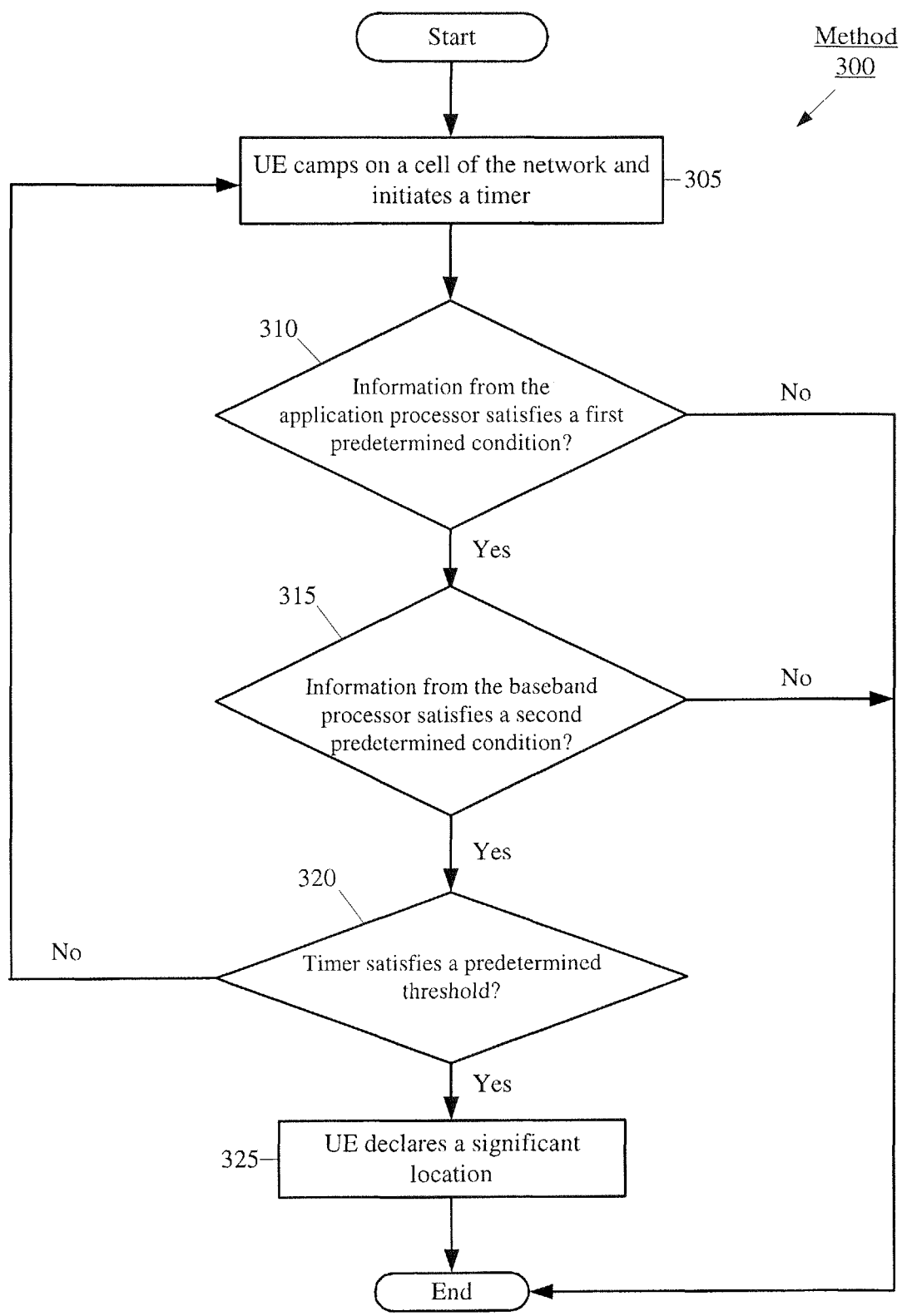
FIG. 3 shows an exemplary method for the UE to declare a significant location according to various exemplary embodiments.

FIG. 3 shows an exemplary method 300 for the UE 110 to declare a significant location according to various exemplary embodiments. The method 300 will be described with regard to the network arrangement 100 of FIG. 1 and the UE 110 of FIG. 2.

In 305, the UE camps on a cell of the network and initiates a timer. For example, the UE 110 may camp on the eNB 120A. The timer may provide an indication as to whether the UE 110 is camped on the eNB 102A for at least the predetermined amount of time.

In 310, the UE 110 determines whether information from the application processor satisfies a first predetermined condition. The first predetermined condition may indicate whether the UE 110 is being relatively stationary. This determination may be based on a plurality of factors related to the geographic location and/or mobility of the UE 110. If the UE 110 determines that the first predetermined condition is satisfied, the method 300 continues to 315 that will be discussed below. However, if the information from the application processor suggests that the UE 110 is moving at a speed that is beyond general walking speed or there is a change in geographic location by a predetermined distance, the first predetermined condition is not satisfied. Thus, the method 300 ends and a significant location may not be declared.

To determine whether information from the application processor satisfies the first predetermined condition, the UE 110 may have a client that is configured to receive information from various modules of the operating system. For example, the client may receive information from the location module of the UE 110 which may provide services for determining the geographic location of the UE 110. The location module may collect information from various hardware components including, but not limited to, cellular radios, WiFi radio, global positioning system (GPS), Bluetooth radio, barometer, accelerometer, magnetometer, compass, etc. However, reference to the location module is merely provided for illustrative purposes. Different operating systems may refer to similar modules or entities by a different name.

In 315, the UE 110 determines whether information from the baseband processor satisfies a second predetermined condition. The second predetermined condition may indicate whether the UE 110 is being relatively stationary and may be based on a plurality of factors related to the characteristics of the network. A change in the characteristics of the network may correlate to a change in location. For example, if measurement data corresponding to the camped cell changes or the identities of the neighbor cells change, this may indicate that the UE 110 is no longer located within the general area the UE 110 was located in when the timer was started in 305. If the UE 110 determines that the second predetermined condition is satisfied, the method 300 continues to 320 that will be discussed below. If the second predetermined condition is not satisfied, the method 300 ends and a significant location may not be declared.

The plurality of factors for determining the second predetermined condition may include, but are not limited to, a change in serving cell identity (e.g., a cell's corresponding cell ID, frequency, legacy location area codes, legacy routing area codes, LTE tracking area codes, NR registration area codes. etc.), a change in neighbor cell identity, a change in serving cell measurement data (e.g., signal-to-noise-ratio, reference signal receive power (RSRP), reference signal receive quality (RSRQ), reference signal strength indicator (RSSI), etc.) or a change in neighbor cell measurement data. Another factor may be a change in distance between the UE 110 and the eNB 120A based on RSRP or timing advance value related to random access channel signaling. Another factor may be cellular angle of arrival (e.g., angle (0-360) relative to camped cell) estimated from multiple input multiple output (MIMO) pre-coding matrix index. Similarly, even if the UE 110 is not utilizing the WLAN 124 for a network connection, the UE 110 may use access point (AP) identities (e.g., basic serving set ID (BSSID), MAC address, serving set ID (SSID), etc.) and their corresponding measurement data as an indication of the location of the UE 110.

In 320, the UE 110 determines whether the value of the timer that was initiated in 305 satisfies a predetermined threshold. If the timer does not satisfy the predetermined threshold in 320, the method returns to 310. If the timer satisfies the predetermined threshold the method 300 continues to 325.

As will be described in detail below with regard to FIG. 8, the process of declaring a significant location and determining whether the UE 110 is located at an already declared significant location may occur simultaneously. Further, the exemplary embodiments are not limited to declaring a significant location based on both the baseband processor and the application processor satisfying a corresponding predetermined condition. Other exemplary embodiments may relate to declaring the significant location based on only information from the baseband processor satisfying a predetermined condition or only information from the application processor satisfying a predetermined condition. Thus, the example of information from both the baseband processor and the application processor satisfying a predetermined condition is merely provided for illustrative purposes.

In 325, the UE 110 declares a significant location. Thus, the UE 110 may generate a protocol profile, tag the significant location with a significant location ID and add the protocol profile to the protocol profile database. The protocol profile may include, in part, various network characteristics that enable the UE 110 to identify that the UE 110 is operating within the significant location. These characteristics may be similar to the information from the application processor that provides the basis for the determination in 310 and the information from the baseband processor that provides the basis for the determination in 315. Accordingly, the protocol profile for the significant location may include information such as, but not limited to, information regarding the geographic location of the UE 110 and the mobility of the UE 110 that occurred while the timer was running, the cell ID of the camped cell and neighboring cells, the measurement data of the camped cell and the neighbor cells, the distance between the UE 110 and the cell, the cell angle of arrival and other cellular network identities such as, the public land mobile network (PLMN) identifier, global cell ID, location/routing/tracking/registration area codes, etc. As mentioned above, the UE 110 may continue to collect information corresponding to the significant location and update the corresponding protocol profile. Thus, the size and/or the characteristics indicative of a significant location may change over time as more information about the significant location is learned by the UE 110.

Figure 4:
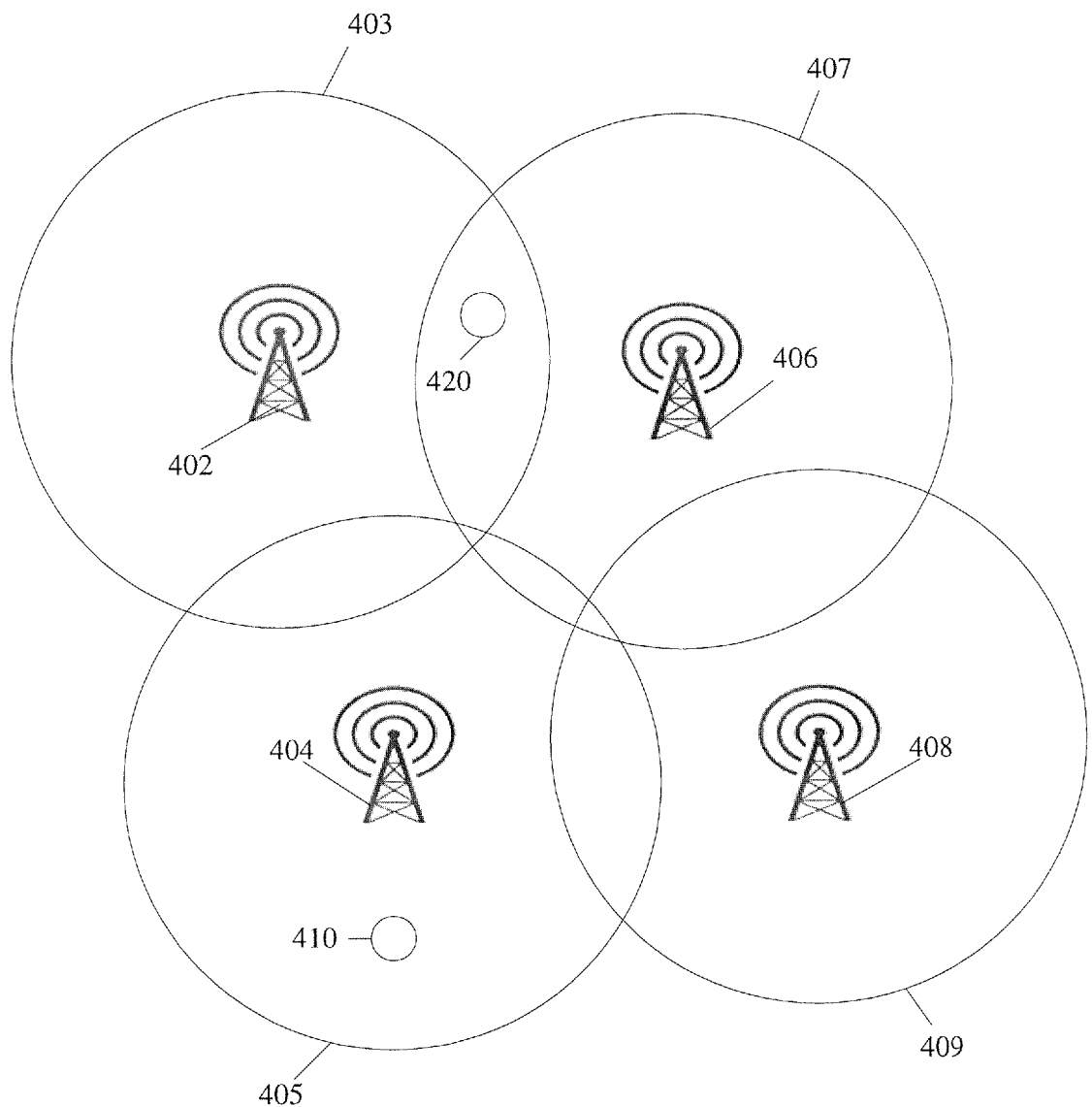
FIG. 4 shows an example of a portion of the network that includes a plurality of cells and a plurality of significant locations.

FIG. 4 shows an example of a portion of the network that includes a plurality of cells 402, 404, 406, 408 and a plurality of significant locations 410, 420. The cell 402 has a coverage area 403, the cell 404 has a coverage area 405, the cell 406 has a coverage area 407, the cell 408 has the coverage area 409.

The significant location 410 is located within the coverage area 405 of the cell 404. Thus, the protocol profile of the significant location 410 includes characteristics indicative of being camped on the cell 404 in this general area within the coverage area 405 of the cell 404.

The significant location 420 is located within the coverage area 403 of the cell 402 and the coverage area 407 of the cell 406. Since the significant location 420 is located within both of these coverage areas, it is possible for the UE 110 to be camped on either the cell 402 or the cell 406 when operating within this general area. However, in this exemplary scenario, the protocol profile associated with the significant location 420 is based on being camped on the cell 406. Thus, the protocol profile may be defined relative to both characteristics of the camped cell 406 and characteristics of the neighbor cell 402. However, the power saving mechanism that may be implemented based on the protocol profile are associated with being camped on the cell 406. The UE 110 may maintain a database of multiple protocol profiles. Thus, there may be another protocol profile that is also associated with approximately the same general area as the significant location 420 but is based on being camped on the cell 402. In some exemplary embodiments, to limit the memory space consumed by the protocol profile database, the UE 110 may combine multiple protocol profiles that are associated with similar locations into a single entry.

Figure 5:
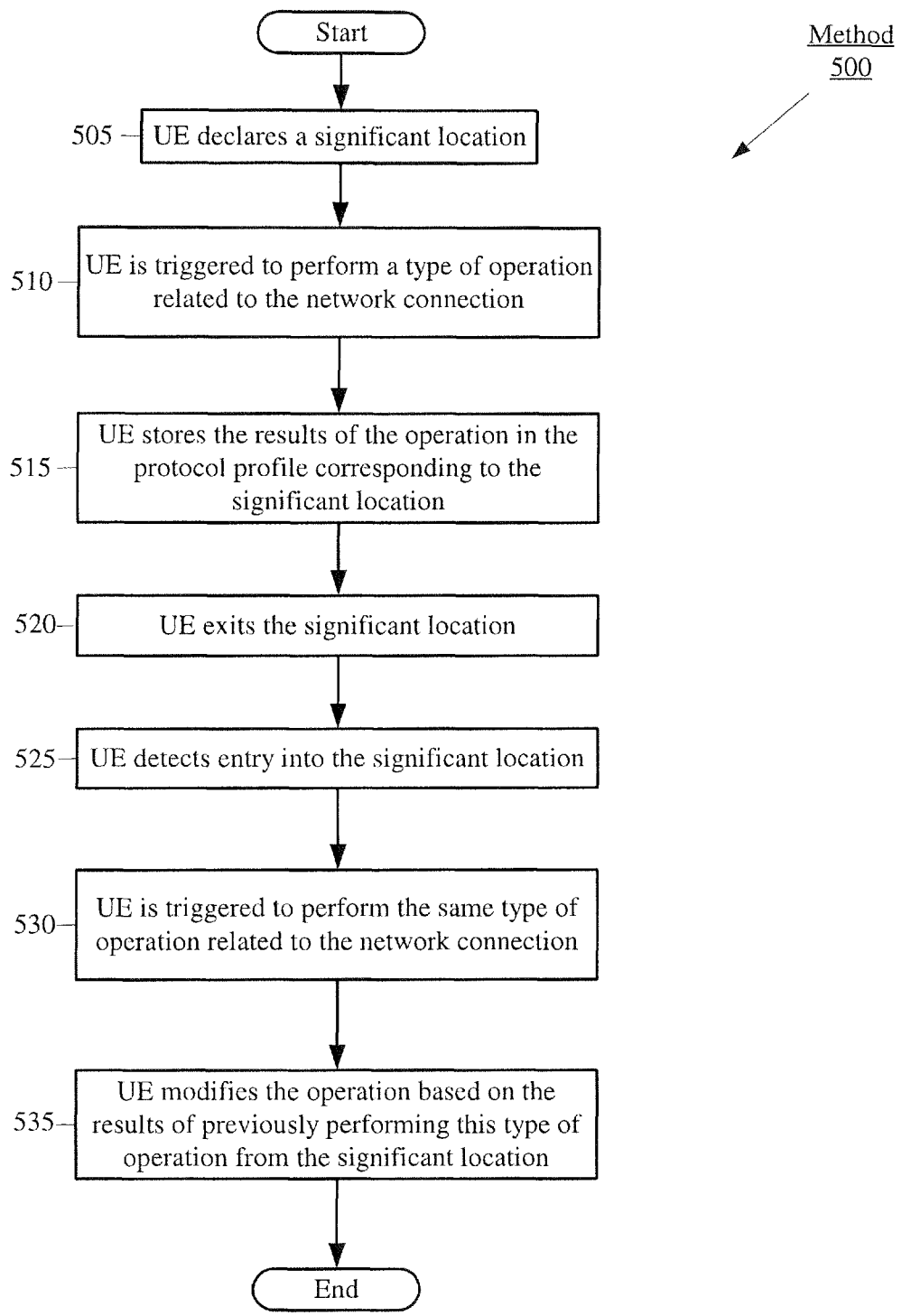
FIG. 5 shows an exemplary method for the UE to implement power saving mechanisms at a significant location according to various exemplary embodiments.

FIG. 5 shows an exemplary method 500 for the UE 110 to implement power saving mechanisms at a significant location according to various exemplary embodiments. The method 500 will be described with regard to the network arrangement 100 of FIG. 1, the UE 110 of FIG. 2 and the method 300 of FIG. 3.

In 505, the UE 110 declares a significant location. As mentioned above with regard to FIG. 3, this may include generating a protocol profile corresponding to the significant location and then storing the protocol profile in the protocol profile database. In this exemplary scenario, the significant location corresponds to the user's home.

When the UE 110 is operating at the significant location, the UE 110 may initially perform operations related to the network connection in the conventional manner. The UE 110 may then capture information related to the results of performing operations in the conventional manner and may store this information in the protocol profile corresponding to the significant location. Thus, after the UE 110 declares a significant location, the UE 110 is configured to begin to store and capture this type of information.

In 510, the UE 110 is triggered to perform a type of operation related to the network connection. In this example, the UE 110 encounters a type of connectivity issue with the currently camped cell eNB 120A and experiences no service. As a result, the UE 110 is triggered to search for a new cell to camp on in the conventional manner. In this example, the result is the UE 110 regaining service by camping on the neighbor cell eNB 120B by performing cell reselection based on measurement data.

In 515, the UE 110 stores the results of the operation in the protocol profile corresponding to the significant location.

In 520, the UE 110 exits the significant location. For example, the user and thus, the UE 110 may leave the user's home.

In 525, the UE 110 detects entry into the significant location (e.g., the user returns home). For example, the application processor may provide an indication that the UE 110 is currently located at the significant location based on GPS information and the corresponding protocol profile.

Alternatively, the baseband processor may identify characteristics of the network that correspond to the protocol profile. As mentioned above, when the UE 110 is operating at a significant location, the UE 110 may initially perform operations related to the network connection in the conventional manner. Thus, upon entry into the significant location the UE 110 is again configured to store and capture the results of operations performed related to the network connection.

In 530, the UE 110 is triggered to perform the same type of operation related to the network connection that was performed in 510. Accordingly, the UE 110 determines that the results for this type of operation are stored in the protocol profile corresponding to this significant location.

In 535, the UE 110 modifies the operation based on the results of previously performing this type of operation from the significant location. In this example, instead of searching for a new cell to camp on in the conventional manner, the UE 110 modifies the operation and searches specifically for the eNB 120B. Thus, compared to the conventional operation, the UE 110 scans fewer frequency bands and processes less information. Accordingly, the UE 110 is able to conserve power (e.g., scan fewer frequency bands, process less information) based on the results of previously performing this operation from the significant location. This example is merely provided for illustrative purposes, exemplary scenarios related to learning and adapting to the results of particular operations are discussed in more detail below with regard to FIGS. 8-11.

The above description relates to initially declaring a significant location and provides a general overview of how the UE 110 may implement various power saving mechanisms based on learning and adapting to the operations performed from the significant location in the particular manner. The following portion of the description may be categorized as relating to: 1) generating a protocol profile and maintaining the protocol profile database; 2) power saving mechanisms.

Generating a Protocol Profile and Maintaining the Protocol Profile Database

As mentioned above, when the UE 110 is operating at a significant location the UE 110 may collect information regarding interactions with the network from the significant location. Subsequently, the UE 110 may store this information in the protocol profile for the corresponding significant location. From the UE 110 perspective, there may be a variety of different types of operations performed for a variety of different purposes.

The protocol profile may generally include characteristics of the network that the UE 110 learns from operating from the significant location. These characteristics may include information such as, but not limited to, identities of network entities, protocol parameters, metrics related to the cellular network, etc. The characteristics may also include information related to the behavior of the UE 110 when operating at the significant location.

To provide a general example of the various interactions that may occur between the UE 110 and the network, consider the following exemplary aspects of establishing, maintaining and utilizing the network connection.

The UE 110 may be configured to be in one of a plurality of different operating states when the UE 110 is camped on a cell of a network. One operating state may be characterized as RRC idle state and another operating state may be characterized as RRC connected state. RRC refers to the radio resource control (RRC) protocols. Those skilled in the art will understand that when the UE 110 is in a RRC connected state, the UE 110 may exchange information and/or data with the connected network. The exchange of information and/or data may enable the UE 110 to perform functionalities available via the network connection. Further, those skilled in the art will understand that when the UE 110 is connected to the LTE-RAN 120 and in RRC idle state the UE 110 is generally not exchanging data with the network and radio resources are not being assigned to the UE 110 within the network. However, when the UE 110 is operating in RRC idle state the UE 110 may listen for transmissions from the network. Those skilled in the art will understand that the RRC idle and connected states are terms associated with an LTE network. However, throughout this description these terms are being used generally to describe states the UE 110 may be in when connected to any network and that exhibit the characteristics described above for the RRC idle and connected states.

While in RRC idle state the UE 110 may listen for information such as but not limited to, primary synchronization signals (PSS) and secondary synchronization signals (SSS), Master Information Block (MIB), broadcast messages, System Information Block (SIB), paging notifications etc. In response, the UE 110 may issue a request to the network that indicates that the UE 110 wants to be moved to the RRC connected state. Thus, a successful transition from the RRC idle state to the RRC connected state may include the exchange of messages between the UE 110 and the first cell of the first network.

Transitioning from a RRC connected state to a RRC idle state may be referred to as RRC connection release and transitioning from a RRC idle state to a RRC connected state may be referred to as RRC connection setup or RRC connection reestablishment. However, reference to RRC connection setup, RRC connection reestablishment and RRC connection release is merely provided for illustrative purposes. Other networks may refer to similar operations by different names. The exemplary embodiments are not limited to RRC connected state and RRC idle state. For example, when the UE 110 is connected to a 5G network, the UE 110 may be configured to be in an RRC inactive state. In RRC inactive mode, the UE 110 maintains an RRC connection while minimizing signaling and power consumption. As described above, reference to any particular operating state is merely provided for illustrative purposes, the exemplary embodiments may apply to any suitable operating state for the UE 110.

The UE 110 may perform measurements on the cell the UE 110 is currently camped on and may also perform measurements on neighbor cells in the surrounding area. The specific type of measurement data collected may be based on network protocols or may be predetermined in any other suitable manner. The measurement data may be based on a single measurement, based on a plurality of measurements, derived from a measurement, derived from a plurality of measurements or based on a combination thereof. For example, when the UE 110 is camped on the eNB 120A, the UE 110 may measure the RSRP and/or the RSRQ of the serving cell 120A and the neighbor cell 120B.

The measurement data may be utilized by the UE 110 in determining which cell the UE 110 is to camp on. For example, while the UE 110 is camped on the eNB 120A, the UE 110 may perform measurements on the eNB 120A and the neighbor cell eNB 120B. The UE 110 may perform these measurements on a periodic basis, in accordance with a schedule, based on a timer, in response to an event or predetermined condition defined by the network protocols or a combination thereof. The measurement data may indicate that the connection available via the eNB 120A is not suitable and the connection via the eNB 120B would provide a suitable connection. Thus, cell reselection may be initiated and the UE 110 may attempt to camp on the eNB 120B. However, this example is merely provided for illustrative purposes, the exemplary embodiments may apply to any operation where the UE 110 utilizes measurement data in determining which cell the UE 110 is to camp on.

Further, the measurement data may be utilized by the network in determining which cell the UE 110 is to camp on. For example, when the UE 110 is camped on and in an RRC connected state with the eNB 120A, the UE 110 may perform measurements for the serving cell 120A and the neighbor cell 120B. The specific contents and format of the measurement report may be based on the corresponding network protocols. Subsequently, the UE 110 may transmit a measurement report to the LTE-RAN 120 that includes an indication that the connection to the eNB 120A is no longer suitable and the connection available via the eNB 120B would provide a suitable connection. Accordingly, the LTE- RAN 120 may initiate a handover procedure and the UE 110 may transition from being camped on and in an RRC connected state with the eNB 120A to being camped on and in an RRC connected state with the eNB 120B. The network may initiate a handover procedure based on a variety of factors including, but not limited to, signal quality, a cell's coverage area and balancing the load of the network. A handover procedure may be performed between cells within the same network or between cells of different networks. Further, reference to a handover or a measurement report is merely provided for illustrative purposes and the exemplary embodiments may apply to any operation that involves the network utilizing measurements performed by the UE 110 in determining which cell the UE 110 is to camp on.

Network protocols may also include various signaling that takes place after the UE 110 has successfully transitioned to an RRC connected state. For instance, to get Non-Access Stratum (NAS) services from the network (e.g. internet connectivity), network entities beyond the cell may be aware of the presence of the UE 110 to provide the bearers that enable the UE 110 to utilize these services. This may include the UE 110 communicating with various network entities such as the Mobility Management Entity (MME) (e.g. via the connected cell). Connecting to the MME may be achieved by an attach procedure. Once the attach procedure is successfully completed, a context is established for the UE 110 in the MME and the corresponding bearers are established. After the attach procedure is complete the UE 110 may be registered with the network. For a variety of different reasons, while the UE 110 is registered with the network, one of the bearers may be released and the UE 110 may be unable to perform various functionalities. To establish the bearers while registered, the UE 110 may send a service request to the MME. The service request may be triggered because the UE 110 has pending uplink transmissions that require the bearers or the network has downlink transmissions that require the bearers.

Further, a connectivity issue between the UE 110 and a particular cell of the corresponding network may occur. Throughout this description, a connectivity issue may refer to any instance where the UE 110 is configured to camp on a particular cell and the UE 110 experiences no service or limited service where the UE 110 cannot perform the full scope of functionalities normally available to the UE 110 via the network connection. The connectivity issue may be the result of an action or inaction by the UE 110, a cell (e.g., eNB 120A, eNB 120B), the network (e.g., LTE-RAN 120) or a combination thereof. The connectivity issue may be caused by at least one of a plurality of factors, such as but not limited to, the location of the UE 110, signal strength, noise, interference, network congestion, network configuration, radio link failure (RLF), an attempt to camp on a cell fails, a handoff procedure fails, protocol stack requirements, failure of an RRC procedure, the connection is released, lack of response to a service request, beam failure, beam recovery failure, an out of service (OOS) event, etc.

Accordingly, with regard to a particular significant location, there is a wide variety of information that may be stored in the protocol profile. The more time the UE 110 spends at the significant location the more information the UE 110 may learn. For example, the UE 110 may collect various types of information to identify a serving cell such as, but not limited to, the PLMN ID, the frequency band or channel the serving cell may utilize (e.g., E-UTRA absolute radio frequency channel number (EARFCN), UTRA absolute radio frequency channel number (UARFCN)), cell global identity, physical cell ID (PCI), primary scrambling codes (PSC) and the ranges of measurement data in RRC connected state and/or RRC idle state corresponding to the serving cell. The UE 110 may also collect similar information to identify neighbor cells.

In another example, the UE 110 may collect information corresponding to number of random access channel (RACH) retransmissions after which RACH transmission is successful, the number of radio link control (RLC) retransmission after which RLC transmission is successful, the identity of the cell and frequency after an OOS event or a RLF, the identifies of cells traversed before the UE 110 experiences an OOS event, RRC reestablishment success rate, the amount of time for successful RRC reestablishment, downlink scheduling rate, uplink grant patterns and link quality metrics (LQM). Further, since the characteristics of the network relative to a significant location may change based on the time and/or day of operation, the UE 110 may associate the information stored in the protocol profile with a particular day and/or time the UE 110 captured this information.

Figure 6:
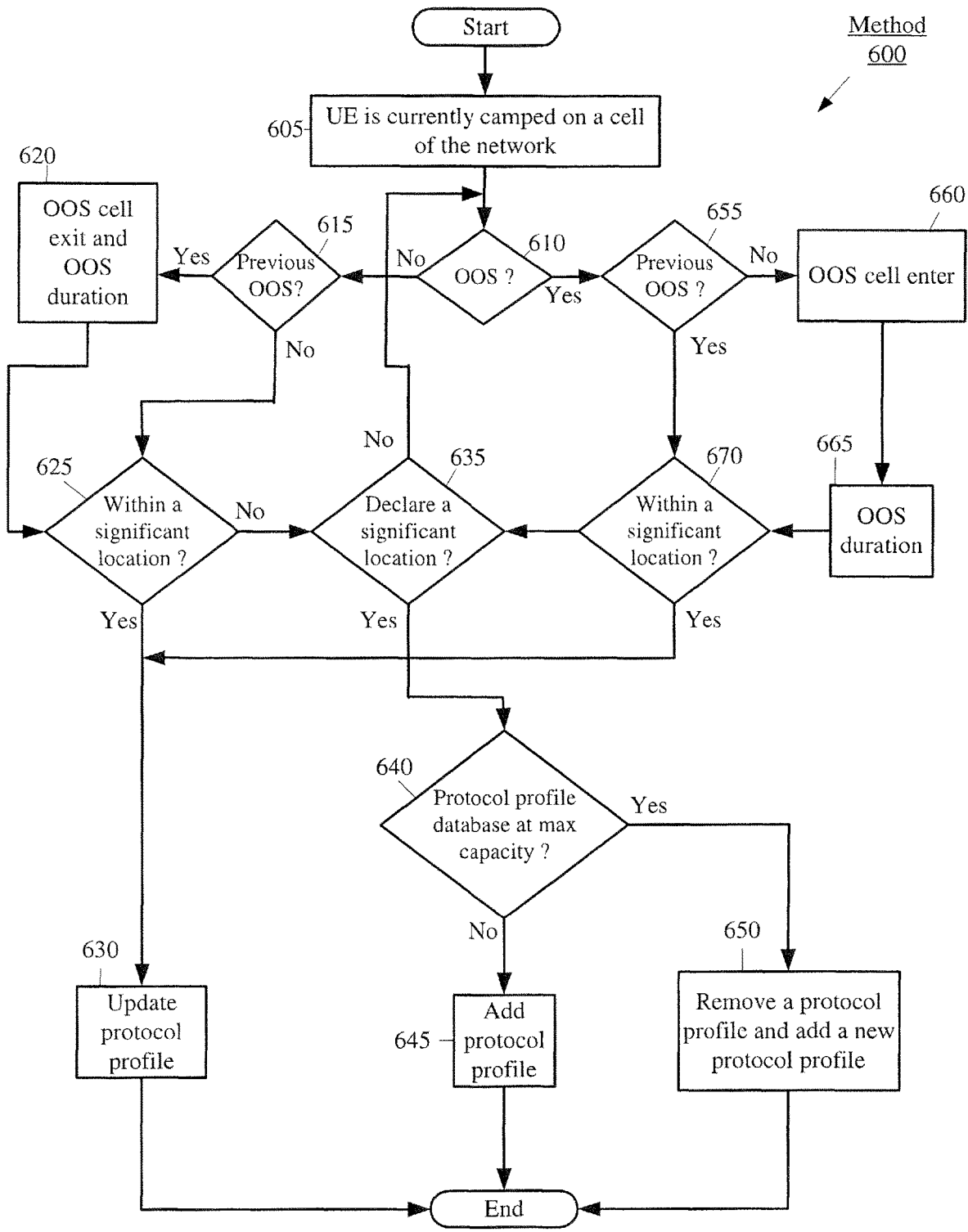
FIG. 6 shows an exemplary method for the UE to manage the protocol profile database according to various exemplary embodiments.

FIG. 6 shows an exemplary method 600 for the UE 110 to maintain the protocol profile database according to various exemplary embodiments. The method 600 will be described with regard to the network arrangement 100 of FIG. 1 and the UE 110 of FIG. 2.

In 605, the UE 110 is currently camped on a cell of the network. In this scenario, several different results may occur. The UE 110 may determine to update a protocol profile that is currently stored in the protocol profile database, add a protocol profile to the protocol profile database based on declaring a significant location or continue to monitor for the possibility of adding a protocol profile to the protocol profile database.

In 610, the UE 110 determines whether the UE 110 is currently experiencing an OOS event. The UE 110 may be triggered to initiate the process of maintaining the protocol profile database in response to identifying a predetermined event or may be configured to maintain the protocol profile based on a schedule or a periodic basis. The predetermined event may relate to identifying information regarding a characteristic of the network and/or the behavior of the UE 110 that the UE 110 is configured to include in a protocol profile.

If the UE 110 is not currently experiencing an OOS event in 610, the method 600 continues to 615. In 615, the UE 110 determines whether the UE 110 was previously experiencing an OOS event. For example, if the UE 110 is triggered to initiate the process of maintaining the protocol profile database in response to identifying a predetermined event the UE 110 may determine if the UE 110 was experiencing an OOS event the previous instance in which the UE 110 was triggered to initiate the process of maintaining the protocol profile database. Similarly, if the UE 110 is configured to maintain the protocol profile database based on a schedule, the UE 110 may determine whether the UE 110 was experiencing an OOS event the previous instance in which the UE 110 initiated the process of maintaining the protocol profile database based on the schedule. If the UE 110 was previously experiencing an OOS event, the method 600 continues to 620. If the UE 110 did not previously experience an OOS event the method 600 continues to 625.

In 620, the UE 110 determines the identity of the cell the UE 110 was camped on when the UE 110 exited the OOS event. Further, the UE 110 may also monitor the duration during which the UE 110 experiences OOS. Thus, the UE 110 may update the OOS duration based on exiting the OOS event. Subsequently, the method 600 continues to 625.

In 625, the UE 110 determines whether the UE 110 is currently within a significant location. To make this determination, the UE 110 may query the database with any available information that may identify a protocol profile. For example, the UE 110 may query the database with information received from the application processor describing the current location of the UE 110, the cell ID of the currently camped cell, neighbor cell IDs, measurement data corresponding to the currently camped cell, measurement data corresponding to neighbor cells, information corresponding to the WLAN APs, etc.

If the UE 110 is currently in a significant location the method 600 continues to 630. In 630, the UE 110 updates a protocol profile that is currently stored within the protocol profile database. This may include information such as the cell the UE 110 was previously camped on when the UE 110 exited the OOS event, the duration during which the UE was OOS, the current latitude/longitude from the application processor, the identity and measurement information corresponding to the cellular network and the WLAN, etc. Subsequently, the method 600 ends.

Returning to 625, if the UE 110 is currently not located within a significant location the method 600 continues to 635. In 635, the UE 110 determines whether the UE 110 is to declare a general area a significant location. This process is described above with regard to FIG. 3. If the factors to declare a significant location are not satisfied the method 600 returns to 610. If the factors to declare a significant location are satisfied the method 600 continues to 640.

In 640, the UE 110 determines whether the protocol profile database is at maximum capacity. If the protocol profile database is not at maximum capacity, the method 600 continues to 645 where a protocol profile corresponding to the declared significant location is generated and added to the protocol profile database.

If the protocol profile database is at maximum capacity, the method 600 continues to 650. In 650, the UE 110 removes a protocol profile from the protocol profile database to make room for the protocol profile that is to be generated for the significant location declared in 635. The process of removing a protocol profile from the protocol profile database will be described in detail below with regard to FIG. 7. Subsequently, the UE 110 adds the new protocol profile to the protocol profile database.

Returning to 610, if the UE 110 is currently experiencing an OOS event the method 600 continues to 655. In 655, the UE 110 determines whether the UE 110 was previously experiencing an OOS event. This determination is substantially similar to the determination made in 615. If the UE 110 was previously experiencing an OOS, the method 600 continues to 660. If the UE 110 was not previously experiencing an OOS, the method 600 continues to 665.

In 660, the UE 110 determines that the UE 110 entered an OOS event while on the currently camped cell. Subsequently, in 665, the UE 110 starts monitoring the duration during which the UE 110 is OOS. Similarly, returning to 655, if the UE 110 was previously OOS, the UE 110 updates the duration in which the UE has been OOS in 665.

In 670, the UE 110 determines whether the UE 110 is currently within a significant location. This determination is the same determination that is made in 625. Like 625, if the UE 110 determines that the UE is currently within a significant location the method 600 continues to 630 and if the UE 110 determines that the UE is currently not within a significant location the method 600 continues to 635.

Figure 7:
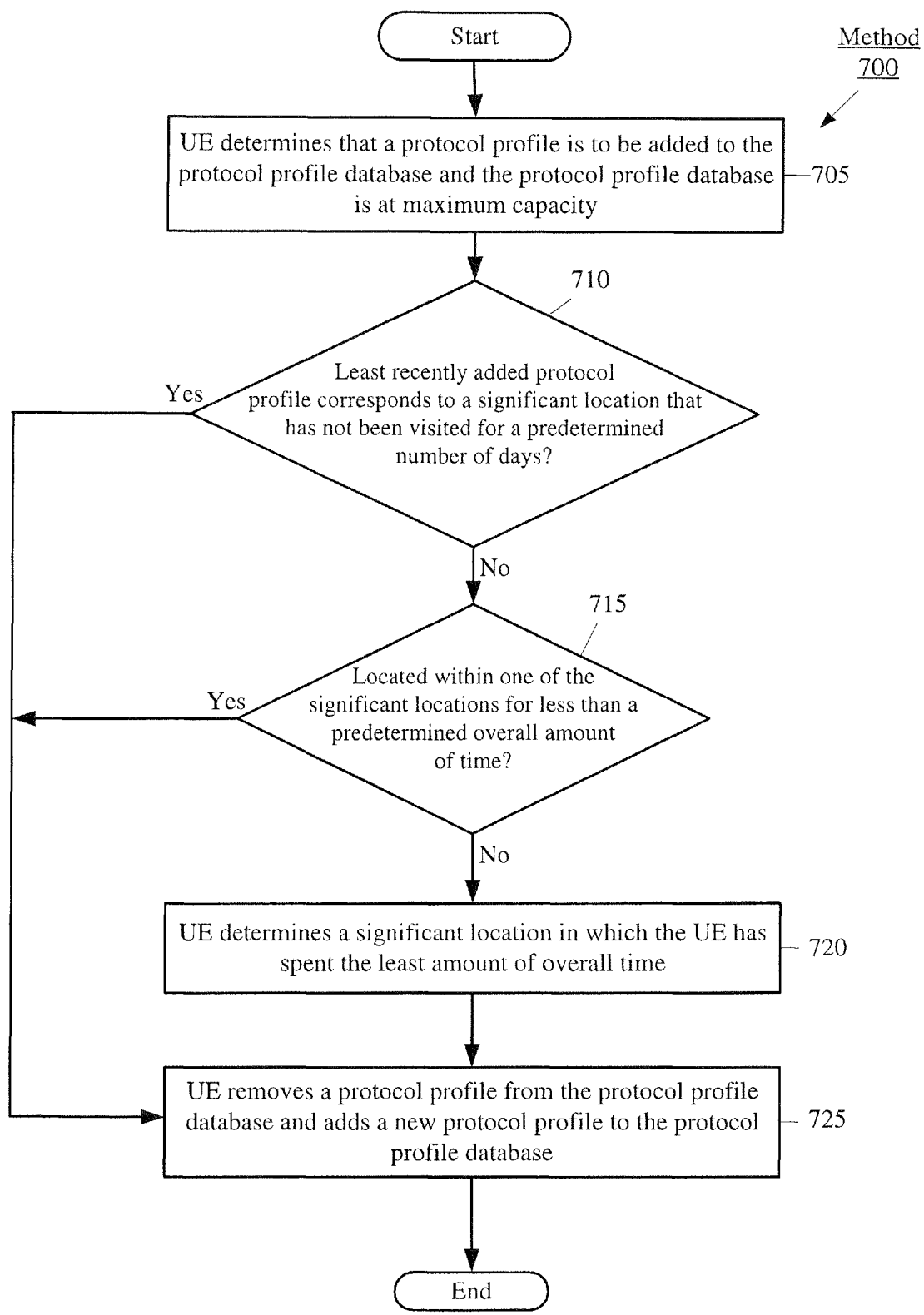
FIG. 7 shows an exemplary method for the UE to add a protocol profile to a protocol profile database that is at maximum capacity according to various exemplary embodiments.

FIG. 7 shows an exemplary method 700 for the UE 110 to add a protocol profile to a protocol profile database that is at maximum capacity according to various exemplary embodiments. The method 700 will be described with regard to the network arrangement 100 of FIG. 1 and the UE 110 of FIG. 2.

In 705, the UE 110 determines that a protocol profile is to be added to the protocol profile database and the protocol profile database is at maximum capacity. This is same step described above with regard to 650 of the method 600.

In 710, the UE 110 determines whether the earliest entered protocol profile in the protocol profile database corresponds to a significant location that has not been visited by the UE 110 for a predetermined number of days. This may indicate to the UE 110 that the UE 110 is unlikely to visit this significant location again. Thus, if the corresponding significant location has not been visited by the UE 110 within a predetermined number of days, the method 700 continues to 725 where the corresponding protocol profile is removed from the database. If the corresponding significant location has been visited by the UE 110 within the predetermined number of days, the method 700 continues to 715.

In 715, the UE 110 determines whether the UE 110 has been located within one of the significant locations for less than a predetermined amount of overall time. This may indicate to the UE 110 that the UE 110 does not frequently visit this significant location. Thus, if the UE 110 has been located within one of the significant locations for less than a predetermined amount of overall time, the method 700 continues to 725 where the corresponding protocol profile is removed from the database. If the UE 110 has been not located within one of the significant locations for less than a predetermined amount of overall time, the method 700 continues to 720.

In 720, the UE 110 determines the significant location in which the UE 110 has spent the least amount of overall time.

In 725, the UE 110 removes a protocol profile from the protocol profile database and then adds the protocol profile mentioned in 705 to the protocol profile database.

The exemplary embodiments are not limited to only removing protocol profiles when the UE 110 determines that the protocol profile database is at maximum capacity. Alternatively, the UE 110 may monitor for any of the factors listed in 710, 715 or 720 on a periodic basis.

Power Saving Mechanisms

The protocol profile for a significant location may enable the UE 110 to perform various operations from the significant location in a power efficient manner. As mentioned above, when the UE 110 is located at a significant location, the UE 110 may initially perform an operation in the conventional manner. The UE 110 may then store information regarding the circumstances and results of the operation in the protocol profile. The next time the UE 110 encounters a similar scenario when operating from the significant location, instead of performing the operations in the conventional manner, the UE 110 may modify the operation to optimize power consumption.

Figure 8:
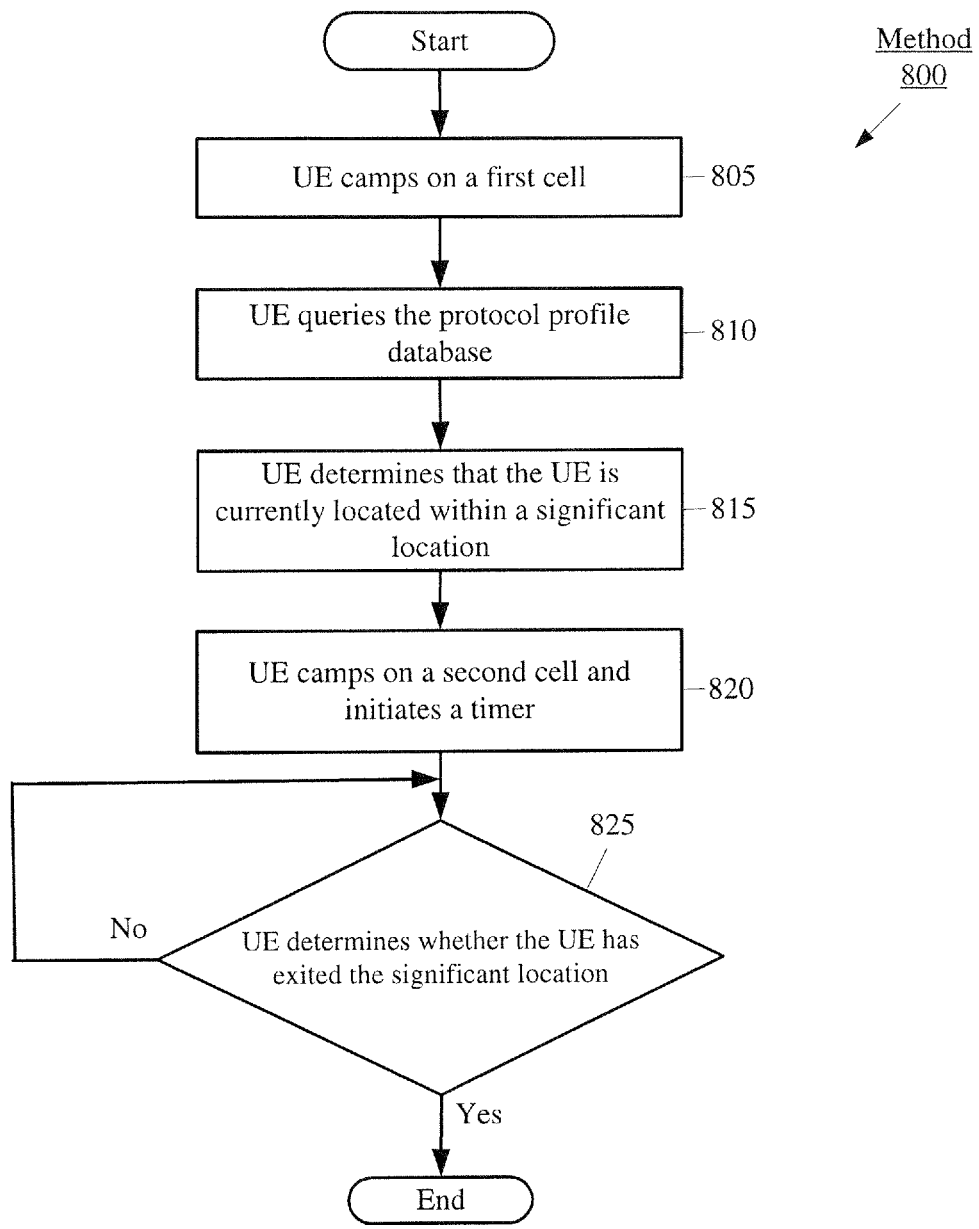
FIG. 8 shows an exemplary method for the UE to detect entry within a significant location and exit from the significant location.

FIG. 8 shows an exemplary method 800 for the UE 110 to detect entry within a significant location and exit from the significant location. The method 800 will be described with regard to the network arrangement 100 of FIG. 1 and the UE 110 of FIG. 2.

In 805, the UE 110 camps on a first cell of the network. When camped, the UE 110 may collect information from the application processor indicative of the current geographic location of the UE 110. The UE 110 may also collect information from the baseband processor that provides an indication of the characteristics of the current network environment of the UE 110. For example, the UE 110 may collect cell IDs corresponding to the currently camped cell, cell IDs corresponding to neighbor cells, measurement data corresponding to the currently camped cell and neighbor cells, information regarding the WLAN, etc. In 810, the UE 110 queries the protocol profile database with the information collected in 805.

In 815, the UE 110 determines that the UE 110 is currently located within a significant location. For example, in response the query performed in 810, the protocol profile database may provide an indication that the protocol profile database includes a protocol profile that corresponds to the queried information.

As mentioned above, detecting entry into a significant location and determining whether to declare a significant location may be occurring contemporaneously. Thus, the UE 110 may set a timer when camped on the cell as described above with regard to the method 300. There may be a predetermined amount of time that relates to declaring a location a significant location as described above in 320-325 of the method 300. There may be a further predetermined amount of time that triggers the UE 110 to query the protocol database to determine whether the UE 110 has entered a significant location. The further predetermined amount of time may correspond to a lesser amount of time than the predetermined amount of time referenced in 320. Thus, in some exemplary embodiments, the UE 110 may set a timer when camped on a cell and if information from the application processor and/or the base band processor satisfy a predetermined condition upon the occurrence of a first predetermined amount of time the UE 110 may query the protocol profile database as mentioned above in 815. If the UE 110 determines that the UE 110 is not located at a significant location, the UE 110 continues to monitor whether information from the application processor and/or the baseband processor satisfy a predetermined condition. If the information satisfies the predetermined condition until the occurrence of a second predetermined amount of time, the UE 110 may declare a significant location as described above in 320-325.

Returning to the method 800, in 820, the UE 110 camps on a second cell of the network and initiates a timer. Camping on the second cell may indicate to the UE 110 that the UE 110 has exited the significant location. However, when camping on the second cell, the UE 110 may also monitor for entry into a further significant location. Accordingly, in this example, the UE 110 may use a first predetermined threshold that may indicate that the UE 110 has exited the first significant location and a second predetermined threshold that may be related to determining whether a new significant location is to be declared.

In 825, the UE 110 determines whether the UE 110 has exited the significant location. If the UE 110 returns to the previously camped cell, this may indicate to the UE 110 that the UE 110 has not exited the significant location. If the UE 110 remains camped on the second cell for a duration that satisfies the first predetermined threshold, this may indicate to the UE 110 that the UE 110 has exited the significant location.

Figure 9:
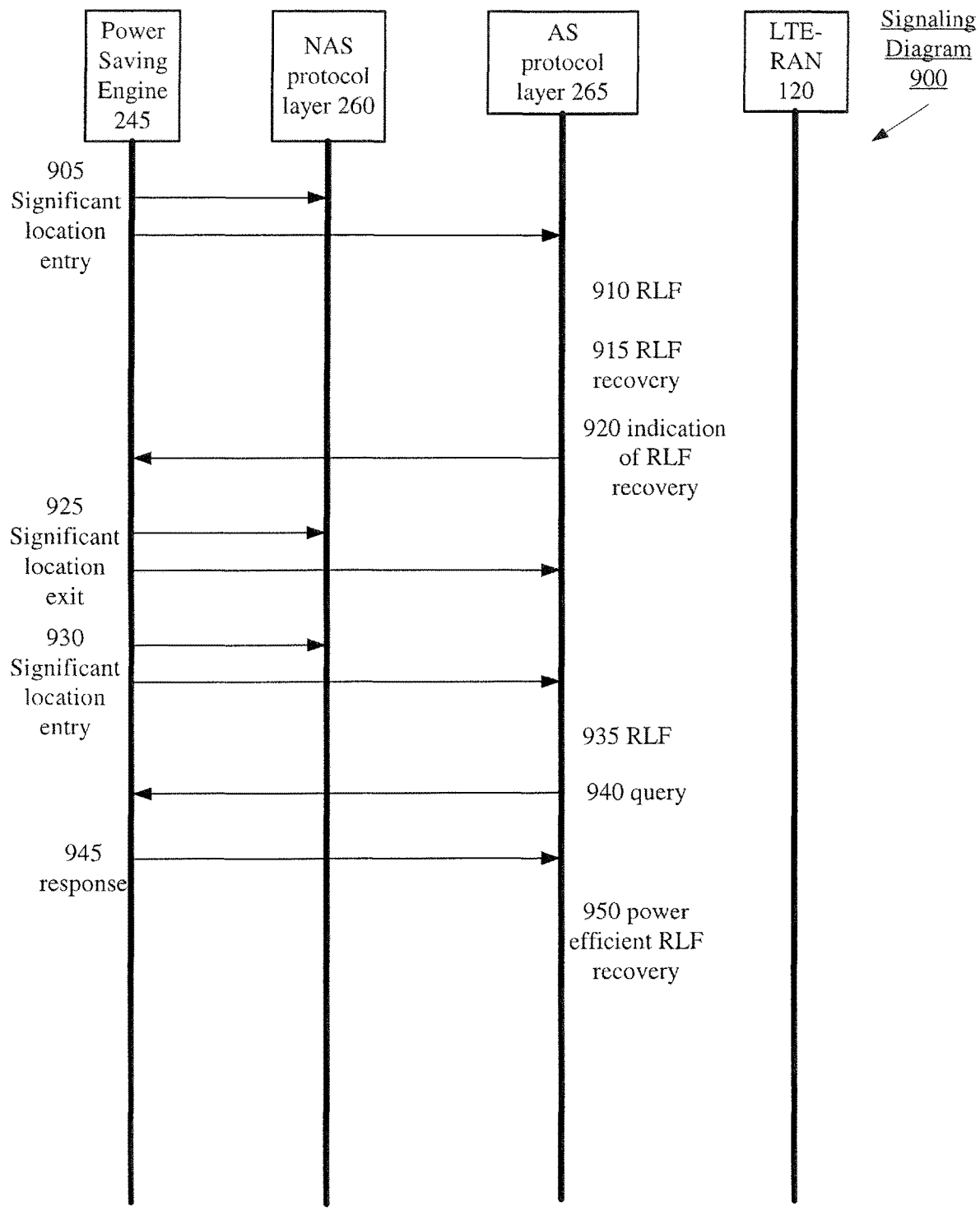
FIG. 9 shows an exemplary signaling diagram that relates to implementing a power saving mechanism for RLF recovery according to various exemplary embodiments.

FIG. 9 shows an exemplary signaling diagram 900 that relates to implementing a power saving mechanism for RLF recovery according to various exemplary embodiments. The method 900 will be described with regard to the network arrangement 100 of FIG. 1 and the UE 110 of FIG. 2.

In 905, the power saving mechanism engine 245 sends a notification to the NAS protocol layer 260 of the UE 110 and the AS protocol layer 265 of the UE 110 indicating that the UE 110 has entered a significant location.

In 910, the UE 110 experiences RLF with the currently camped cell of the LTE-RAN 120. Subsequently, the UE 110 searches for a cell to camp on and finds a second cell of the LTE-RAN 120 to camp on. Thus, in 915, the UE 110 experiences RLF recovery on the second cell. In 920, the AS 265 sends a signal to the power saving mechanism engine 245 that indicates the results of the RLF recovery (e.g., an identifier for the second cell, the amount of time it took to achieve RLF, etc.). The results are then stored in the protocol profile associated with that significant location. Subsequently, in 925, the UE 110 exits the significant location.

In 930, the UE 110 returns to the significant location and thus, the power saving mechanism engine 245 once again sends a notification to the NAS protocol layer 260 of the UE 110 and the AS protocol layer 265 of the UE 110 indicating that the UE 110 has entered a significant location. In 935, the UE 110 once again encounters an RLF on the while operating from the significant location.

In 940, the AS 265 queries the power saving mechanism engine 245 for information about RLF when operating from the significant location. In 945, the power saving mechanism engine 245 responds to the query by providing a response that indicates to the AS 265 that the second cell previously provided a successful RLF recovery at this significant location.

Accordingly, in 950, the UE 110 performs power efficient RLF recovery by performing a search for the second cell. Thus, instead of performing a search in the conventional manner as in 915, the UE 110 conserves power by searching directly for the second cell because the second cell previously provided RLF recovery under similar circumstances. Thus, the previous interactions with the LTE-RAN 120 at the significant location enables the UE 110 to save power and perform a quicker recovery by searching for a particular cell that the UE 110 has previously successfully utilized for RLF recovery.

Figure 10:
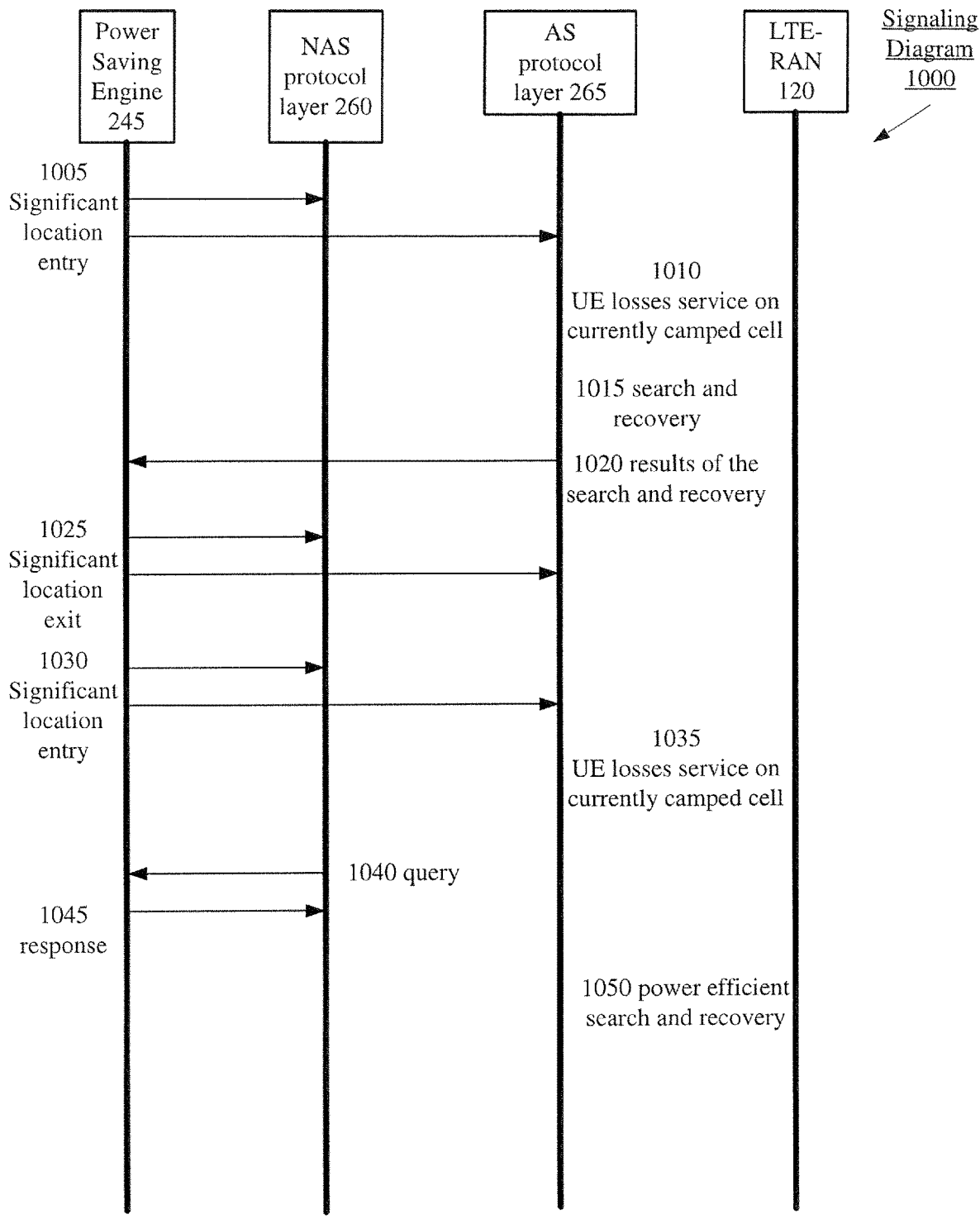
FIG. 10 shows an exemplary signaling diagram that relates to implementing a power saving mechanism for OOS recovery according to various exemplary embodiments.

FIG. 10 shows an exemplary signaling diagram 1000 that relates to implementing a power saving mechanism for OOS recovery according to various exemplary embodiments. The method 1000 will be described with regard to the network arrangement 100 of FIG. 1 and the UE 110 of FIG. 2.

In 1005, the power saving mechanism engine 245 sends a notification to the NAS protocol layer 260 of the UE 110 and the AS protocol layer 265 of the UE 110 indicating that the UE 110 has entered a significant location. The UE 110 is currently in service and currently camped on a first cell.

Subsequently, in 1010 the UE 110 loses service on the first cell. As a result, in 1015, the UE 110 may perform a search in the conventional manner. The search results in the UE 110 regaining service on a second cell on a different RAT.

In 1020, the AS 265 sends a signal to the power saving engine 245 that includes the results of the search, including, but not limited to, the identity of the second cell, the identity of the RAT, recovery time, rate of OOS, etc. This information is then stored in the protocol profile associated with the location. Subsequently, in 1025, the UE 110 exits the significant location and sends a signal notifying the NAS protocol layer 260 and the AS protocol layer 265.

In 1030, the UE 110 returns to the significant location and thus, the power saving mechanism engine 245 once again sends a notification to the NAS protocol layer 260 of the UE 110 and the AS protocol layer 265 of the UE 110 indicating that the UE 110 has entered the significant location. In 1035, the UE 110 once again loses service while operating from the significant location.

In 1040, the NAS protocol layer 260 queries the power saving mechanism engine 245 for information about OOS when operating from the significant location. In 1045, the power saving mechanism engine 245 responds to the query by providing a response that indicates to the NAS protocol layer 260 that the second cell on the second RAT previously enabled the UE 110 to regain service. The response may also any other information that was included in 1020.

Accordingly, in 1050, the UE 110 performs power efficient search and recovery that prioritizes the second cell on the second RAT based on the results of the previous search and recovery in 1020. The other information provided by the power saving engine 245 may allow the UE 110 to optimize the timing of the scan in a power efficient manner. Thus, the previous interactions with the network at the significant location enable the UE 110 to save power and perform a quicker recovery by searching for a particular cell and a particular RAT during instances in which the UE 110 has previously successfully recognized OOS recovery.

Figure 11:
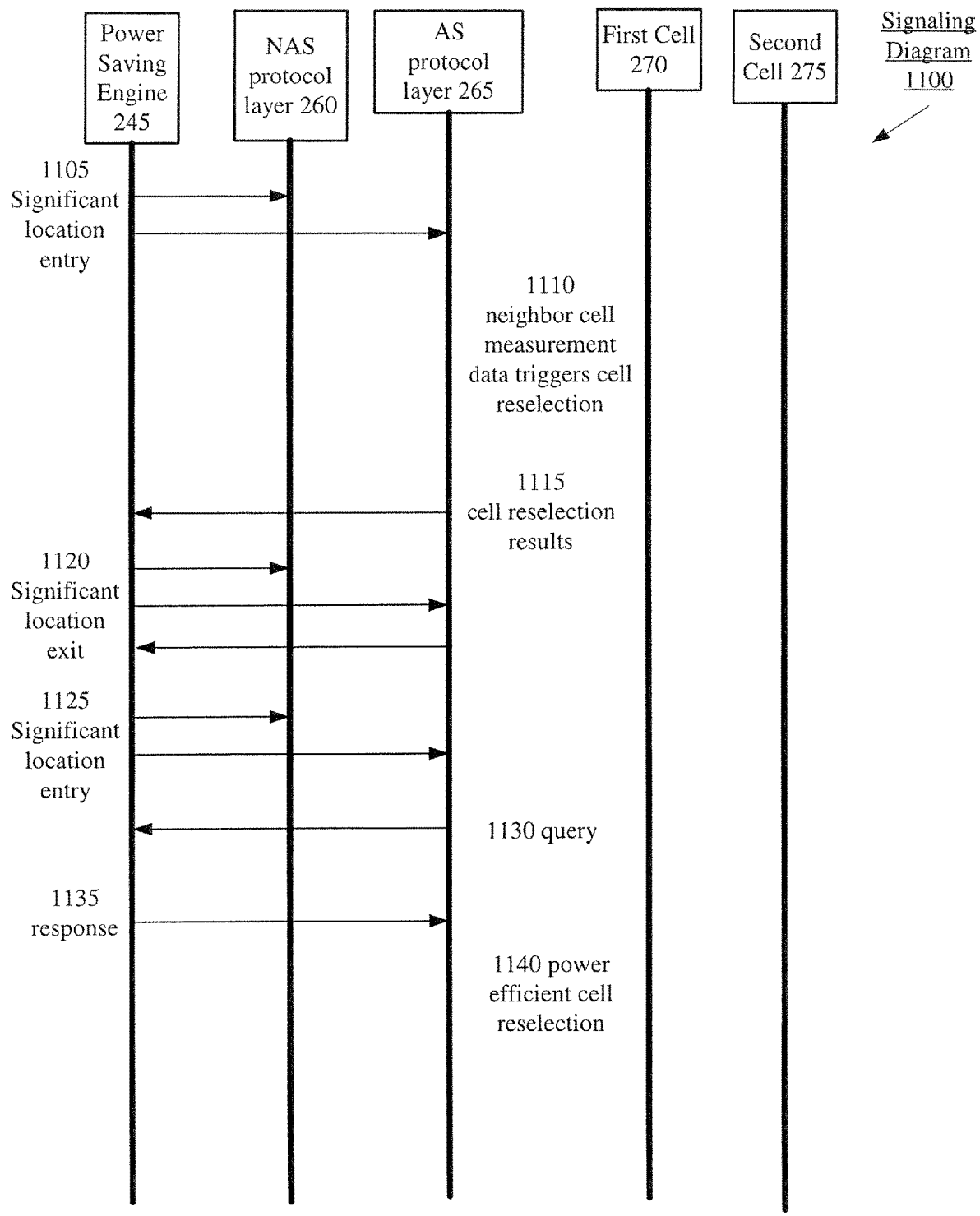
FIG. 11 shows an exemplary signaling diagram that relates to implementing a power saving mechanism for cell reselection according to various exemplary embodiments.

FIG. 11 shows an exemplary signaling diagram 1100 that relates to implementing a power saving mechanism for cell reselection according to various exemplary embodiments. The method 1100 will be described with regard to the network arrangement 100 of FIG. 1 and the UE 110 of FIG. 2.

In 1105, the power saving mechanism engine 245 sends a notification to the NAS protocol layer 260 of the UE 110 and the AS protocol layer 265 of the UE 110 indicating that the UE 110 has entered a significant location. The UE 110 is currently in service and camped on the first cell 270.

In 1110, neighbor cell measurement data triggers cell reselection. In this exemplary scenario, the neighbor cell measurement data corresponded to a plurality of neighbor cells but the measurement data for the second cell 275 triggered a predetermined threshold and causes the UE 110 to perform cell reselection and camp on the second cell 275. Accordingly, in 1115 the AS protocol layer 265 sends the power saving engine 245 the cell reselection results including the identity of the second cell 275 as a cell reselection candidate for this significant location.

Since cell reselection causes the UE 110 to camp on the second cell 275, the UE 110 exits the significant location. Thus, in 1120, the UE 110 exits the significant location and sends a signal notifying the NAS protocol layer 260 and the AS protocol layer 265.

In 1125, the UE 110 returns to the significant location and thus, the power saving mechanism engine 245 once again sends a notification to the NAS protocol layer 260 of the UE 110 and the AS protocol layer 265 of the UE 110 indicating that the UE 110 has entered the significant location.

In 1130, due to the measurement data, the AS protocol layer 265 queries the power saving mechanism engine 245 for information about cell reselection when operating from the significant location.

In 1135, the power saving mechanism engine 245 responds to the query by providing a response that to the AS 265 that includes cell reselection information identifying the second cell 275. Based on this information, the UE 110 may save power by avoiding measurements that correspond to other neighbor cells that were previously not cell reselection candidates for the UE 110 at this significant location. Accordingly, in 1140, the UE 110 performs cell reselection in a power efficient manner and is camped on the second cell 275.

In another exemplary embodiment, the UE 110 may identify network congestion. For example, in response to a RRC connection request, the UE 110 may receive a RRC connection rejection. The RRC connection rejection may include an indication of congestion from NAS signaling, AS signaling, layer 1 signaling, etc. Subsequently, the UE 110 may store the indications of congestion in the protocol profile for the significant location and include an indication of the time of day.

Subsequently, when operating at the significant location at the time of day that congestion was identified, the power saving engine 245 may signal the application processor to restrict background data, discretionary data or any other type of non-critical data. Thus, the UE 110 is able to conserve power by avoiding connections that are unlikely to succeed.

The UE 110 may encounter overlapping coverage areas for cells of different RATs and thus, the UE 110 may be triggered to perform cell reselection between cells of different RATs. For example, the user's home may be included in a coverage area for a first cell that belongs to the LTE-RAN 120 and a second cell that belongs the Legacy-RAN 122 (e.g., WCDMA). Under conventional circumstances, in marginal coverage areas, the UE 110 may often be triggered to perform inter-RAT (iRAT) cell reselection or may encounter OOS events on one Rat and reconnect on another RAT. iRAT transitions may cause excessive signaling. For example, when transitioning from LTE to WCDMA the UE 110 sends a location area update (LAU) and a routing area update (RAU). This may also cause the UE 110 to deregister IMS. When transitioning from WCDMA to LTE the UE 110 may send a TAU. Excessive signaling may result in the UE 110 to spending longer duration in RRC connected state which may cause the UE 110 to experience a power drain.

The UE 110 may be configured to detect excessive signaling related to iRAT transitions when located at a significant location. For example, the UE 110 may be configured to identify a predetermined amount of iRAT transitions within a predetermined amount of time. To reduce excessive signaling, the UE 110 may initially determine the dominant RAT. This may be the RAT in which the UE 110 spends the most amount of time. In this exemplary scenario, between WCDMA and LTE, the dominant RAT is LTE because the UE 110 spends more than 50% of its time camped on LTE when at this significant location.

During operation, when the UE 110 enters CMAS mode while camped on the non-dominant RAT, the UE 110 may set a timer to a predetermined amount of time. If during the duration of the timer, the UE 110 is triggered to an iRAT transition to the dominant RAT then the UE 110 returns to normal service and camps on the dominant RAT. If the timer expires while the UE 110 is camped on the non-dominant RAT, the UE 110 updates registration on the non-dominant RAT and enters normal mode of operation while camped on the non-dominant RAT.

In one exemplary embodiment, the UE 110 may modify the thresholds that may cause the UE 110 to perform iRAT reselection. By lowering the thresholds related of the dominant RAT (e.g., LTE) to below the threshold levels of the other RAT (e.g., WCDMA), the UE 110 may avoid frequently performing iRAT transitions.

In another exemplary embodiment, instead of modifying the thresholds, the UE 110 may enter CMAS mode when the UE 110 is camped on the non-dominant RAT. CMAS mode may be a power efficient mode of operation during which information and/or data related to CMAS messages are processed while other operations related to the cellular network connection are limited, omitted and/or delayed. However, reference to CMAS mode is merely exemplary, as there may be similar modes of operation referred to by different names.

To reduce iRAT transitions that are caused by frequent OOS and then recovery in the other RAT, in one exemplary embodiment the UE 110 may bias cell searches towards the dominant RAT. For example, when the UE 110 experiences OOS at the significant location, the UE 110 may modify operations by setting a timer to a predetermined amount of time and only searching for cells corresponding to the dominant RAT during the duration of the timer. In another exemplary embodiment, the UE 110 may avoid frequent iRAT transitions by declaring itself to be supporting only one RAT. For example, the UE 110 may declare itself to be supporting only the dominant RAT for a predetermined amount of time or until the occurrence of a predetermined condition. Thus, the UE 110 may not perform operations corresponding to the non-dominant RAT for a period of time. As a result, from the network perspective, the UE 110 may not be compatible with the non-dominant RAT and thus, the network will not trigger the UE 110 to perform operations related to the non-dominant RAT.

In another exemplary embodiment, the UE 110 may utilize CMAS mode to reduce iRAT transitions that are caused by frequent OOS and then recovery in the other RAT. For example, the UE 110 may be configured to enter CMAS only mode when camped on the non-dominant RAT at the significant location. The UE 110 may not return to the dominant RAT within a predetermined amount of time while being in CMAS mode unless it is via cell reselection or cell search after an OOS event on the non-dominant RAT. After OOS, if the UE 110 recovers to the dominant RAT then the UE 110 may exit CMAS mode.

In one exemplary embodiment, due to the power cost associated with frequent iRAT transitions, the UE 110 may be configured to monitor for excessive iRAT transitions regardless of whether the UE 110 has determined it is located at a significant location or has determined a dominant RAT. For example, the UE 110 may identify excessive iRAT transitions based on identifying a predetermined number of iRAT transitions within a predetermined amount of time. This may include the UE 110 identifying a predetermined number of cell reselections and/or OOS events on a first RAT and recovery on a second RAT. Subsequently, the UE 110 may implement any of the power saving mechanisms mentioned above with regard to excessive iRAT transitions.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

As described above, one aspect of the present technology is the gathering and use of data available from specific and legitimate sources. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to declare a significant location and learn the characteristics of the network and/or behavior of the UE relative to the significant location. Accordingly, use of such personal information data improves the user experience by enabling a UE to implement various power saving mechanisms based on the UE's previous interactions with the network from a significant location.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, declaring a significant location and learning the characteristics of the network and/or behavior of the UE relative to the significant location may be based on aggregated non-personal information data or a bare minimum amount of personal information, such as the information associated with the significant location being maintained only on the user's device.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method comprising:
   at a user equipment (UE) configured to establish a connection with a network:
   identifying at least one predetermined condition comprising a first predetermined condition indicating whether the UE is located at a location relative to a camped cell of the network for a predetermined amount of time;
   generating a profile for the location based on identifying the first predetermined condition, wherein generating the profile comprises tagging the location with a unique identifier;
   storing the profile in a local database;
   collecting, when at the location tagged with the unique identifier, information corresponding to at least one of characteristics of the network or behavior of the UE; and
   updating the profile based on the information.

2. The method of claim 1, wherein the at least one predetermined condition further comprises a second predetermined condition that is based on information corresponding to the mobility of the UE.

3. The method of claim 1, wherein identifying the first predetermined condition is based on geographical information and mobility information collected by a module being executed by the operating system of the UE.

4. The method of claim 1, wherein identifying the first predetermined condition is based on information received by the baseband processor.

5. The method of claim 1, wherein the characteristics of the network include a cell ID of the camped cell, a cell ID for a neighbor cell, measurement data corresponding to the camped cell and measurement data corresponding to the neighbor cell.

6. The method of claim 1, wherein the characteristics of the network include a cellular angle of arrival corresponding to the camped cell that is based on a multiple input multiple output (MIMO) pre-coding matrix index.

7. The method of claim 1, wherein the characteristics of the network include at least one of a timing advance value based on random access channel (RACH) signaling, a number of RACH transmissions and a number of radio link control (RLC) retransmissions.

8. The method of claim 1, the information is stored in the profile for the location further includes at least one of an identity for an access point (AP) of a wireless local area network (WLAN).

9. The method of claim 1, wherein the UE is a wearable device operating in standalone mode.

10. The method of claim 1, wherein a plurality of profiles corresponding to a plurality of locations are stored in the local database, the method further comprising:
    determining that the local database is at maximum capacity;
    selecting one of the plurality of profiles stored in the local database;
    removing the selected one of the plurality of profiles from the local database; and
    adding the generated profile to the local database.

11. The method of claim 10, wherein the selected one of the plurality of profiles is a profile that was least recently added to the local database, wherein the least recently added profile is selected based on whether the UE has entered a location corresponding to the least recently added profile within a predetermined number of days.

12. The method of claim 10, wherein the selected one of the plurality of profiles is selected based on an overall amount of time the UE has spent at a corresponding location.

13. A processor of a user equipment (UE) configured to perform operations, comprising:
    identifying at least one predetermined condition comprising a first predetermined condition indicating whether the UE is located at a location relative to a camped cell of the network for a predetermined amount of time;
    generating a profile for the location based on identifying the first predetermined condition, wherein generating the profile comprises tagging the location with a unique identifier;
    storing the profile in a local database;
    collecting, when at the location tagged with the unique identifier, information corresponding to at least one of characteristics of the network or behavior of the UE; and
    updating the profile based on the information.

14. The processor of claim 13, wherein the at least one predetermined condition further comprises a second predetermined condition that is based on information corresponding to the mobility of the UE.

15. The processor of claim 13, wherein identifying the first predetermined condition is based on geographical information and mobility information collected by the processor.

16. The processor of claim 13, wherein the characteristics of the network include a cell ID of the camped cell, a cell ID for a neighbor cell, measurement data corresponding to the camped cell and measurement data corresponding to the neighbor cell.

17. The processor of claim 13, wherein the characteristics of the network include a cellular angle of arrival corresponding to the camped cell that is based on a multiple input multiple output (MIMO) pre-coding matrix index.

18. The processor of claim 13, wherein the characteristics of the network include at least one of a timing advance value based on random access channel (RACH) signaling, a number of RACH transmissions and a number of radio link control (RLC) retransmissions.

19. The processor of claim 13, the information is stored in the profile for the location further includes at least one of an identity for an access point (AP) of a wireless local area network (WLAN).

20. A user equipment (UE), comprising:
a transceiver configured to communicate with a network; and
a processor communicatively coupled to the transceiver and configured to perform operations, comprising:
identifying at least one predetermined condition comprising a first predetermined condition indicating whether the UE is located at a location relative to a camped cell of the network for a predetermined amount of time;
generating a profile for the location based on identifying the first predetermined condition, wherein generating the profile comprises tagging the location with a unique identifier;
storing the profile in a local database;
collecting, when at the location tagged with the unique identifier, information corresponding to at least one of characteristics of the network or behavior of the UE; and
updating the profile based on the information.

* * * * *